US008260770B2

(12) United States Patent
Bell et al.

(10) Patent No.: US 8,260,770 B2
(45) Date of Patent: Sep. 4, 2012

(54) SYSTEMS AND METHODS FOR AN EXTENSIBLE BUSINESS APPLICATION FRAMEWORK

(75) Inventors: David G. Bell, Menlo Park, CA (US); Michael Crawford, San Jose, CA (US)

(73) Assignee: Universities Space Research Association, Columbia, MD (US)

( * ) Notice: Subject to any disclaimer, the term of this patent is extended or adjusted under 35 U.S.C. 154(b) by 838 days.

(21) Appl. No.: 12/234,595

(22) Filed: Sep. 19, 2008

(65) Prior Publication Data

US 2009/0083287 A1 Mar. 26, 2009

Related U.S. Application Data

(60) Provisional application No. 60/960,226, filed on Sep. 21, 2007.

(51) Int. Cl.
*G06F 7/00* (2006.01)
(52) U.S. Cl. ........ 707/722; 707/741; 707/769; 709/203; 709/219; 715/234; 715/738
(58) Field of Classification Search ............ 707/999.01, 707/999.003, 722, 741, 769; 709/203, 219; 715/205, 234, 738
See application file for complete search history.

(56) References Cited

U.S. PATENT DOCUMENTS

| | | | |
|---|---|---|---|
| 5,930,801 A | 7/1999 | Falkenhainer et al. | |
| 6,968,338 B1 | 11/2005 | Gawdiak et al. | |
| 2002/0082953 A1* | 6/2002 | Batham et al. | 705/27 |
| 2006/0047646 A1 | 3/2006 | Maluf et al. | |
| 2006/0159109 A1* | 7/2006 | Lamkin et al. | 370/401 |
| 2007/0266007 A1* | 11/2007 | Arrouye et al. | 707/3 |
| 2007/0271305 A1* | 11/2007 | Chandrasekar et al. | 707/200 |

* cited by examiner

*Primary Examiner* — Hosain Alam
*Assistant Examiner* — Jieying Tang
(74) *Attorney, Agent, or Firm* — Sughrue Mion, PLLC

(57) ABSTRACT

Method and systems for editing data from a query result include requesting a query result using a unique collection identifier for a collection of individual files and a unique identifier for a configuration file that specifies a data structure for the query result. A query result is generated that contains a plurality of fields as specified by the configuration file, by combining each of the individual files associated with a unique identifier for a collection of individual files. The query result data is displayed with a plurality of labels as specified in the configuration file. Edits can be performed by querying a collection of individual files using the configuration file, editing a portion of the query result, and transmitting only the edited information for storage back into a data repository.

14 Claims, 16 Drawing Sheets

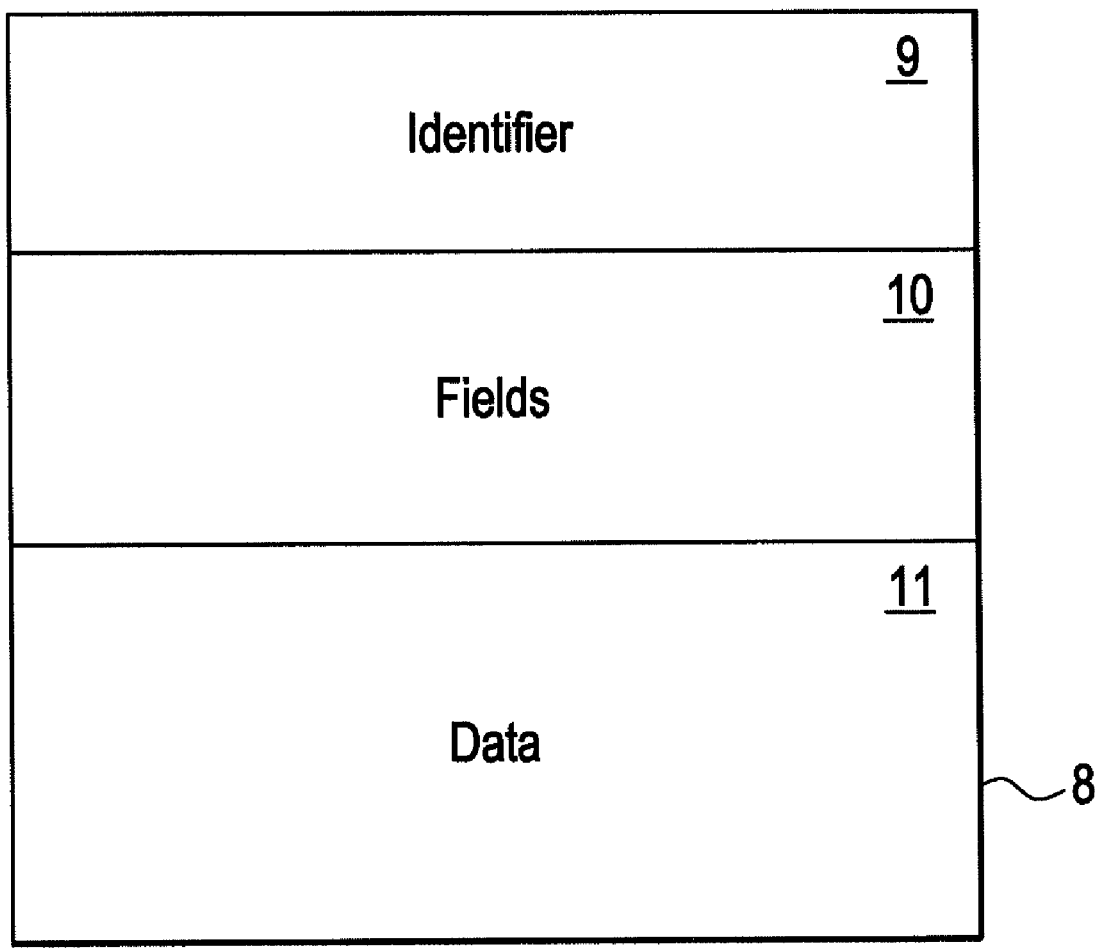

FIG. 4

Example of an individual file as an XML file

```xml
- <Dav_Item>
    <Action_ID>PMC 2005.07.28 Actions</Action_ID>
    <Action>0</Action>
    <Version>1</Version>
    <Status>Please Select</Status>
    <Description/>
    <Criticality>Please Select</Criticality>
    <Initiator/>
    <Event>Please Select</Event>
    <Actionee/>
    <Secondary_Actionee/>
    <Date_Notified/>
    <Due_Date/>
    <Days_Overdue>-38845.5808671296</Days_Overdue>
    <Comments/>
    <Approver>Please Select</Approver>
    <Read_Permissions>Please Select</Read_Permissions>
    <Write_Permissions>Please Select</Write_Permissions>
    <indent>0</indent>
  </Dav_Item>
```
~8

Collection of individual files

FIG. 7
Configuration File Options Interface

📄 [Database Title Here]
Database Subtitle Here]
New Database

Database Options

Display Parameters

| | |
|---|---|
| Database Title: | Default Title |
| Database Subtitle: | Default Subtitle |
| Database Object Type: | Default Object Type |
| Database Object Header: | Default Record Header |

Advanced Options

View Configuration

| | |
|---|---|
| Add: | Document-8345 |
| Delete: | Document-8345 |
| Edit: | Document-8345 |
| View: | Document-8345 |

View Styles

| | |
|---|---|
| Add: | davXSLTLib.Generic.add |
| Delete: | davXLSTLib.Generic.delete |
| Edit: | davXLSTLib.Generic.edit |
| Single: | davXLSTLib.Generic.single |
| View: | davXLSTLib.Generic.view |

You can set default values which will display in the submission forms by default, please set these values here:

Default Values

| Level One Panel One | | Level One Field One |
|---|---|---|
| Child One | Child Two | |
| | | |
| | | |

FIG. 8

Example of form configuration file

```
- <Form>
    <input id="Action_ID" type="text" label="Action Type"/>
    <input id="Action" type="text" label="action"/>
    <textarea id="Description" cols="12" rows="5" label="desc"/>
    <input id="Criticality" type="text" label="critic"/>
    <input id="Initiator" type="text" label="init"/>
  - <select id="Status" label="stat">
<option>Open</option>
<option>Closed</option>
<option>N/A</option>
    </select>
 </Form>
```
~16

FIG. 9

Example of JavaScript form configuration file

```
- <Form>
    <input id="Action_ID" type="text" label="Action Type"/>
    <input id="Action" type="text" label="action"/>
    <textarea id="Description" cols="12" rows="5" label="desc"/>
    <input id="Criticality" type="text" label="critic"/>
    <input id="Initiator" type="text" label="init"/>
  - <select id="Status" label="stat">
<option>Open</option>
<option>Closed</option>
<option>N/A</option>
    </select>
    <input type="submit" onclick="javascript handleClick0" value="Save"/>
    <script type="text/javascript" src="../../handleClick.js"/>
  </Form>
```

User | Logout | My NX

Monthly Report System
Reports Home

Home | Users & Groups | Help

| Report A | July 2007 ▼ | ☐ Edit Mode | Page Break: ○None ○Always ○Avoid | Go |
| Report B | July 2007 ▼ | ☐ Edit Mode | Page Break: ○None ○Always ○Avoid | Go |
| Report C | July 2007 ▼ | ☐ Edit Mode | Page Break: ○None ○Always ○Avoid | Go |
| Report D | July 2007 ▼ | ☐ Edit Mode | Page Break: ○None ○Always ○Avoid | Go |
| Report E | July 2007 ▼ | ☐ Edit Mode | Page Break: ○None ○Always ○Avoid | Go |
| Report F | July 2007 ▼ | ☐ Edit Mode | Page Break: ○None ○Always ○Avoid | Go |

FIG. 13
Example of interface in browser

| Content | Action_ID | ▼ | | | | | | | | | |
|---|---|---|---|---|---|---|---|---|---|---|---|
| Query Configuration | | Go | | | | | | | | | |

| No # | Source File | Action_ID | Action | Version | Status | Description | Criticality | Initiator | Event | Actionee | Secondary_Actionee | Date_Time |
|---|---|---|---|---|---|---|---|---|---|---|---|---|
| 1 | Edit | Test | | | | Test | Please Select | | Please Select | | | |
| 2 | Edit | | | | | | | | | | | |
| 3 | Edit | | | | | | | | | | | |
| 4 | Edit | | | | | | | | | | | |
| 5 | Edit | | | | | | | | | | | |
| 6 | Edit | | | | | | | | | | | |
| 7 | Edit | | | | | | | | | | | |
| 8 | Edit | | | | | | | | | | | |
| 9 | Edit | | | | | | | | | | | |

FIG. 15

Example of user interface for editing specific fields

| No # | Source File | Action_ID | Action | Version | Stat | Action Type | Event | Actionee | Secondary_Actionee | Date_Time |
|---|---|---|---|---|---|---|---|---|---|---|
| 1 | Edit | | | | | test — 31 | | | | |
| 2 | | | | | | action 0 | | | | |
| 3 | | | | | | test — 32 | | | | |
| 4 | | | | | | desc | | | | |
| 5 | | | | | | critic Please Select — 33 | | | | |
| 6 | | | | | | init Open ▼ — 34 | | | | |
| 7 | | | | | | inist Save Clear Cancel | | | | |
| 8 | | | | | | 35  36  37 | | | | |
| 9 | | | | | | | | | | |

Content [Action_ID ▼]  [Go]
[Query Configuration]

30 — dialog box

SYSTEMS AND METHODS FOR AN EXTENSIBLE BUSINESS APPLICATION FRAMEWORK

CROSS-REFERENCE TO RELATED APPLICATION

This application claims priority to and the benefit of the U.S. Provisional Patent Application No. 60/960,226, filed on Sep. 21, 2007, in the U.S. Patent and Trademark Office, the entire content of which is incorporated by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of the grants or cooperative agreement numbers NCC 2-1426 and NNA07BB97C by the National Aeronautics and Space Administration (NASA).

BACKGROUND

1. Field of the Invention

This invention relates generally to systems and methods for an online data repository. More particularly, this invention relates to an online data repository that provides reconfigurable user interfaces and querying capabilities that allow for report generation and editing of data within the data repository.

2. Description of the Related Art

Search technologies are revolutionizing the management of information. With this innovation, a wide range of online business applications can be readily built upon context and/or content search for forms-based and spreadsheet-based user interfaces. Traditional online search services are primarily tools for finding information that has previously been indexed using web crawlers, which support "content" search. Search results often provide links to documents along with a small amount of text that surrounds the search results. Such services do not provide the capability for the search service to act as an online database such that information can be readily uploaded and searched by its context and/or content, by field-value pairs as is permitted in a relational database, or tag-content pairs for databases implemented in Extensible Markup Language (XML). As a result, such search services are not easily integrated with business applications using a universal schema.

There has been progress in providing search capabilities with online content. For example, online search services can be used as a large online database, where users can read structured information using Hypertext Transfer Protocol (HTTP) GET and POST methods, as well as write structured information using HTTP Web-based Distributed Authoring (WEBDAV) PUT and POST methods. Initial application of this web based searching technology is for online business applications that support the management of the research and development organization, which may include online support for items such as action item tracking, asset management, and human resources.

This functionality builds upon prior work in extensible databases where information is accessed from the database in XML format through a simple Uniform Resource Locator (URL) Application Programming Interface (API) using HTTP GET or POST protocols with context and/or content and/or scope and/or Extensible Stylesheet Language Transformations (XSLT) specified. This functionality can also be applied when information is added to the database as XML files using simple HTTP PUT or POST commands as disclosed in the WEBDAV Specification. Lastly, the searching functionality can be used for databases having a universal schema where the fields are fixed and no new fields can be added for different schema. Even with the applications of this searching functionality, there is a need for a general user interface that can be readily configured with specific field information for specific business applications.

Some of these problems have been addressed, such as in U.S. Pat. No. 6,968,338 titled "Extensible Database Framework for Management of Unstructured and Semi-Structured Documents", which describes a platform for building business applications upon searches using a universal schema. Also, U.S. Publication No. 20060047646 titled "Query-Based Document Composition", describes a method for composing documents using the Extended Database (XDB). However, for extensible databases, these publications do not address customization of clients or applications which generally is desired when using XDB databases or any other type of extensible database. Further, these extensible databases also do not provide an easy way to add, edit, or delete individual records that may appear in tabular query results.

As a result, there is a need for user interfaces that are easily configurable for business applications that use extensible databases. More specifically, there is a need for such easily configurable interfaces for extensible databases that use tabular data contained within the databases.

In addition, the conventional online search services are lacking in that they do not provide a way for users of business applications using a universal schema to impose access control on the databases or records contained in the database. U.S. Pat. No. 5,930,801 titled "Shared-Data Environment in Which Each File Has Independent Security Properties", describes a method for assigning access controls to each individual file in a file system but does not describe how such access controls can be imposed on individual files within a database system.

SUMMARY

The above problems can be solved by creating a set of individual files associated with one or more collections of files that are searchable and editable using a configuration file that contains a data structure for a plurality of fields with interface types and layout for an editing interface.

According to one embodiment of the present invention, a method for editing data from a query result is provided. The query result includes data from a plurality of fields contained in a plurality of individual files each assigned with a unique identifier, such that a configuration file specifies the plurality of fields of the individual files. In addition, the plurality of individual files populates a collection of individual files which has a unique collection identifier.

The method includes requesting a query result using the unique collection identifier for a collection of individual files and a unique identifier for a configuration file that specifies a data structure for the query result.

The method further includes generating a query result containing a plurality of fields as specified by the configuration file by combining each of the plurality of individual files associated with a unique identifier for a collection of individual files such that the data of each individual file is differentiated by the unique identifier corresponding to the individual file from which the data originated in the query result.

The method further includes displaying the data of the query result with a plurality of labels as specified in the configuration file that describe the data of the query result.

The method further includes submitting an edit request comprised of at least one field and at least one unique identifier corresponding to an individual file in the query result.

The method further includes retrieving at least one individual file corresponding to the unique identifier of the edit request in the query result.

The method further includes updating the fields of the individual file corresponding to the unique identifier of the edit request in the query result.

The method further includes writing the updated individual file to corresponding the collection of individual files.

BRIEF DESCRIPTION OF THE DRAWINGS

The incorporated drawings constitute part of one or more embodiments of the invention. However, they should not be taken to limit the invention to a specific embodiment. The invention and its mode of operation will be more fully understood from the following detailed description when taken with the incorporated drawings in which like reference numerals correspond to like elements.

FIG. 3 provides an example of an individual file used in the system shown in FIG. 1.

FIG. 4 provides an example of an individual file implemented in XML.

FIG. 7 illustrates a user interface for configuring the configuration file.

FIG. 8 illustrates an example of a configuration file.

FIG. 9 illustrates an example of an XML configuration file containing Javascript code.

FIG. 10 illustrates an interface as seen by a user when requesting a query of data in the data repository.

FIG. 13 illustrates an example of query results that are displayed on the user terminal in tabular format.

FIG. 15 illustrates a user interface that allows a user to edit specific fields.

DETAILED DESCRIPTION

Overview

To create a database within the data repository located on the server, a user is provided with a clickable button to add a database for use by other individuals and/or groups. The created database is easily searchable and editable using standard interfaces. Further, the user can easily configure the database with a simple configuration file. All of these features can be performed without having to perform any database administration on an extensible database platform. Users can also readily search across records in more than one database, and readily ADD, EDIT, or DELETE records on those databases using the same interface. In addition to the web browser interface, a spreadsheet-based interface with similar functionality is also enabled.

Such a database used with one or more configuration files provides users the option of working offline using standard spreadsheet software (e.g., Microsoft Excel) that has similar user interface modes and can synchronize with the server when users are online. A programmatic URL-based interface is also available allowing integration software to connect one or more of these databases with other database systems.

Architecture of Client-Server System

Figure 1:
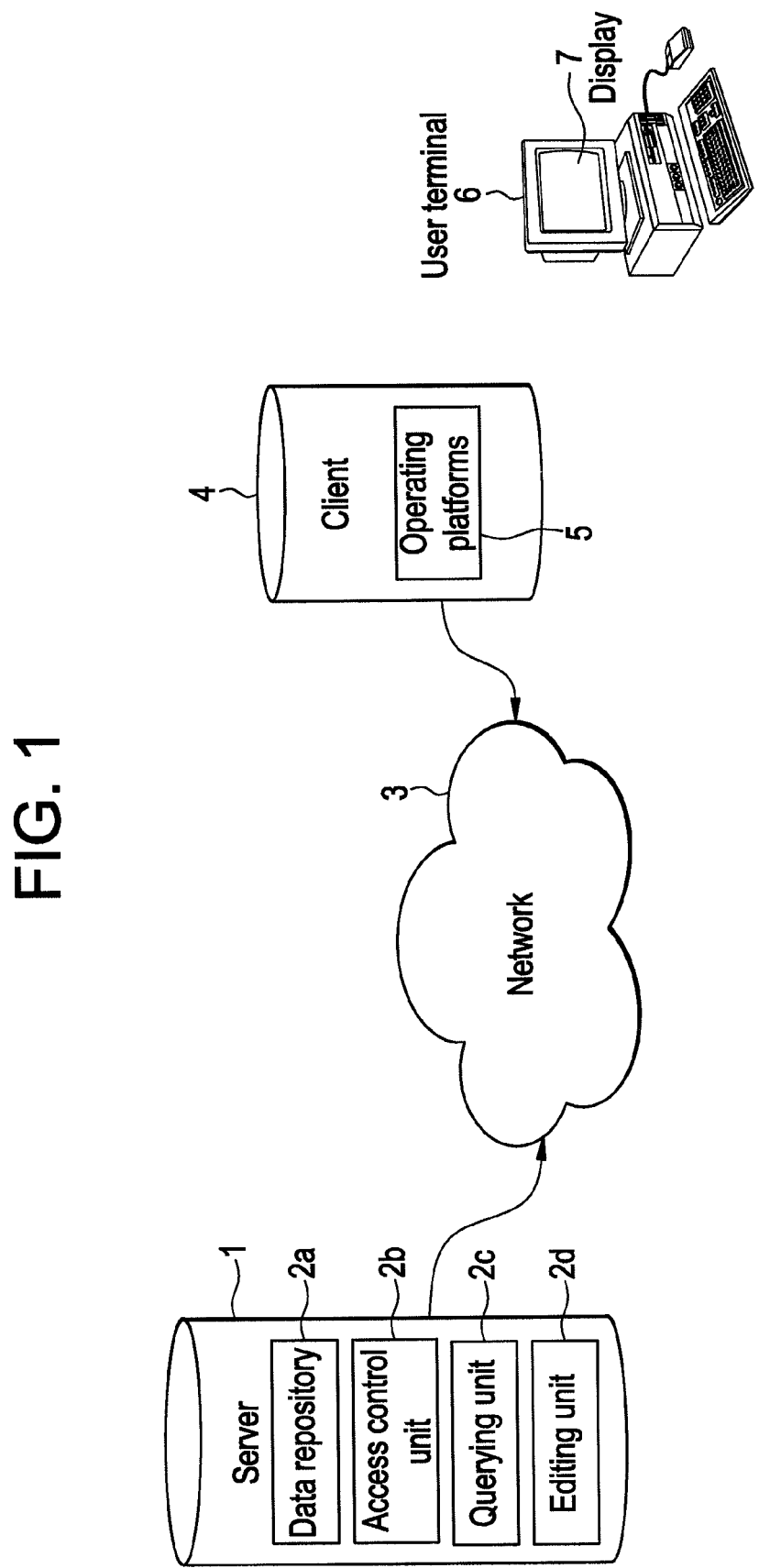
FIG. 1 illustrates client-server architecture of an extensible database framework showing cross-platform support for both web browsers and desktop applications and a data repository on the server-side.

FIG. 1 shows an architecture of a client-server system. The client 4 and server 1 are arranged such that they communicate with each other through a network 3. The server 1 contains a data repository 2a, such as a database, file management system, or content management system. It also can include an access control unit 2b that executes program code to control access to the contents of the data repository. The server also can include a querying unit 2c that executes program code to query the contents of the data repository. An editing unit 2d also can be included in the server and/or client to execute program code that edits information, such as files or records, stored in the data repository. The client 4 contains operating platforms 5, which include web-based applications and desktop applications that allow the user to access the information stored in the data repository 2 on the server 1. The client 4 further communicates with a user terminal 6 that allows for inputs via a peripheral device such as a keyboard or mouse. The client 4 also provides the functionalities of Add, Edit, and Delete, which can be performed on individual files and the contents of individual files. The user terminal 6 further displays information from the server 1 and client 4 to the user through a display 7.

In an embodiment of the present invention, the operating platforms 5 provide a system on which the configurable user interfaces may be implemented with web browsers or spreadsheet applications.

In an embodiment of the present invention, the client 4 uses platform independent Asynchronous JavaScript and XML (AJAX), which communicates with the server 1 through HTTP GET and POST requests. The client 4 uses an HTTP GET request to load an XML data file containing individual files. The data file can be a direct XML file, or a query result XML file, or any other similar file, retuned from an XDB query request. In yet another embodiment of the present invention, other methods of communication with the server 1 may be used such as Microsoft Visual Basic in the form of a configurable spreadsheet interface.

Overview of Extensible Database System

In an embodiment of the present invention, a user can click a button on the user interface to add a database for use by individuals and/or groups, easily search and edit the database using standard interfaces, and easily configure the database with a simple configuration file; all without having to do any database administration given the use of an extensible database platform. The database added by a user can take the form of a conventional database, such as a relational database, or it can take other forms of collections of data, such as a collection of individual files.

Figure 2:
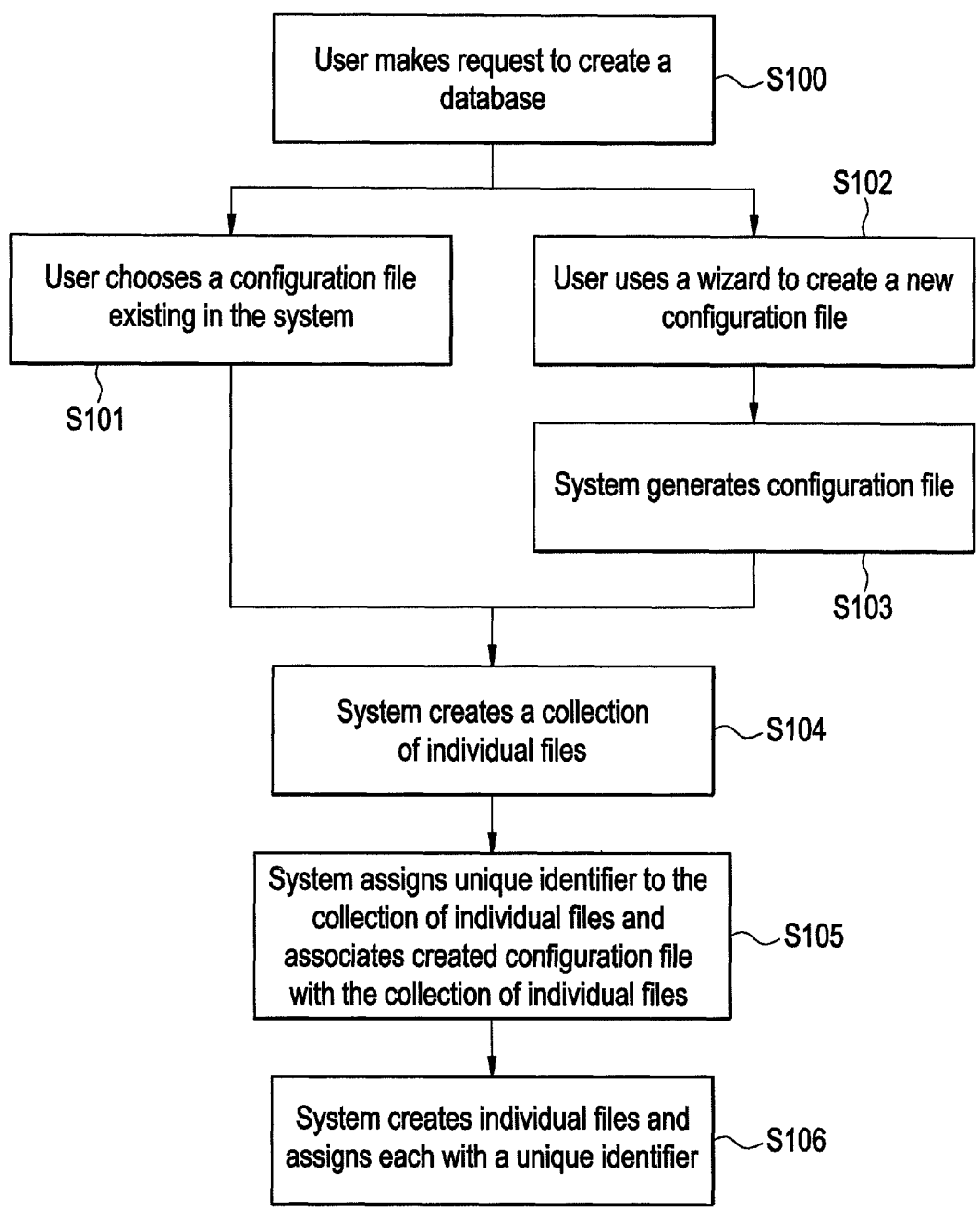
FIG. 2 illustrates an overview of the creation of a database using an extensible database framework.

In an embodiment of the present invention, as illustrated in FIG. 2, when a user requests to create a database (S100), the system will allow the user to choose from a configuration file already existing in the system (S101) or allow the user to create a new configuration file through a wizard (S102, S103).

The system will then create a collection of individual files (S104) and assign a unique identifier to the collection of individual files and associate that collection of individual files with the created configuration file (S105). The system will then create individual files and assign each individual file with a unique identifier (S106). The collection of individual files is then stored on the server 1 as a database and can be accessed when a user makes a request to access the information through a query or by editing content of the database that may be contained within the database.

Individual Files

FIG. 3 provides an example of an individual file 8. Each individual file 8 has a unique identifier 9 associated with it, and includes fields for data 10, and data 11. In an embodiment of the present invention, the individual file 8 can be created as an XML file, which is illustrated in FIG. 4.

Figure 5:
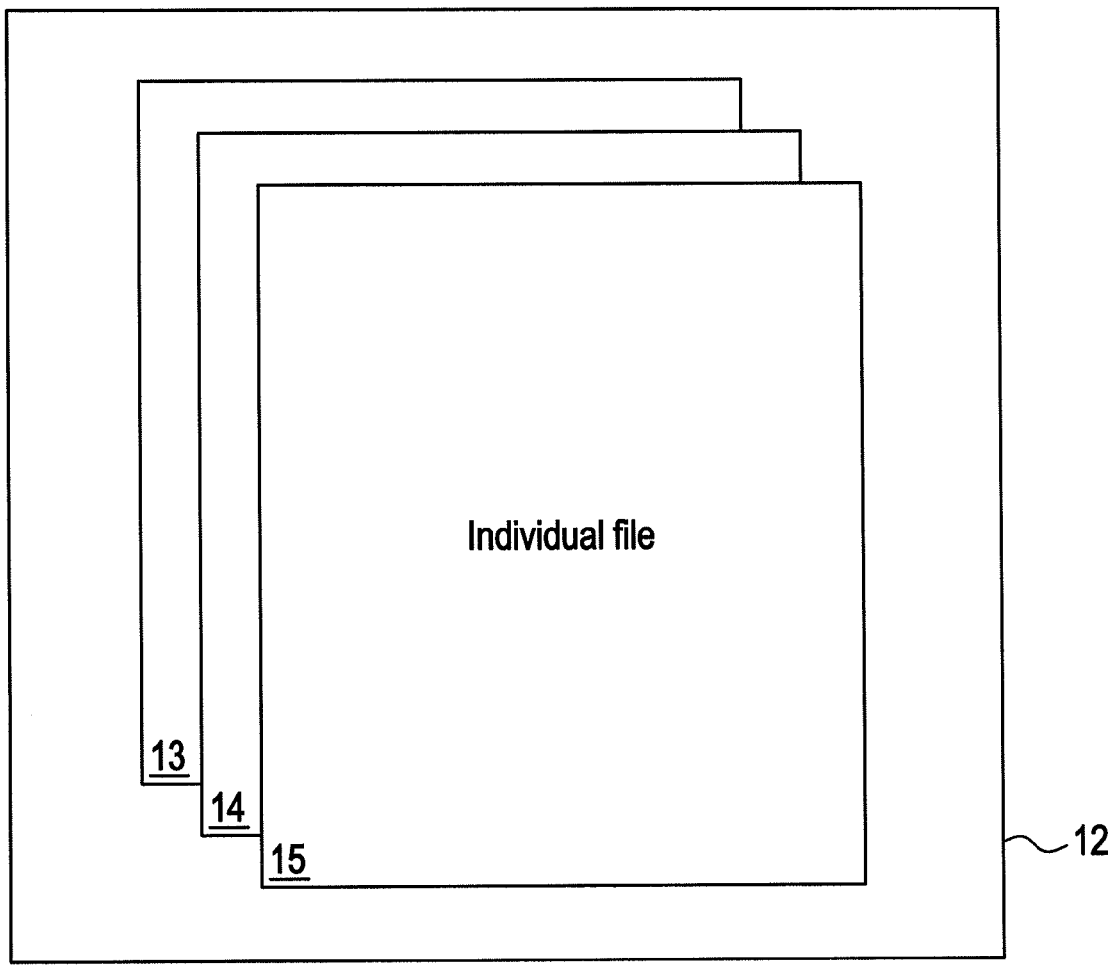
FIG. 5 illustrates a collection of individual files.

Upon creation of a database, the configuration file can be used to group individual files into a collection of individual files which populates the created database. Each collection of individual files is assigned its own unique identifier. Therefore, each individual file 8 within a collection of individual files has a unique identifier and the collection itself has its own unique identifier. An example collection of individual files 12 is illustrated in FIG. 5. Each individual file 13, 14, 15 contained within a collection of individual files 12 is distinguished from the other individual files 13, 14, 15 by the unique identifier assigned to that individual file 13, 14, 15.

Configuration Files

Figure 6:
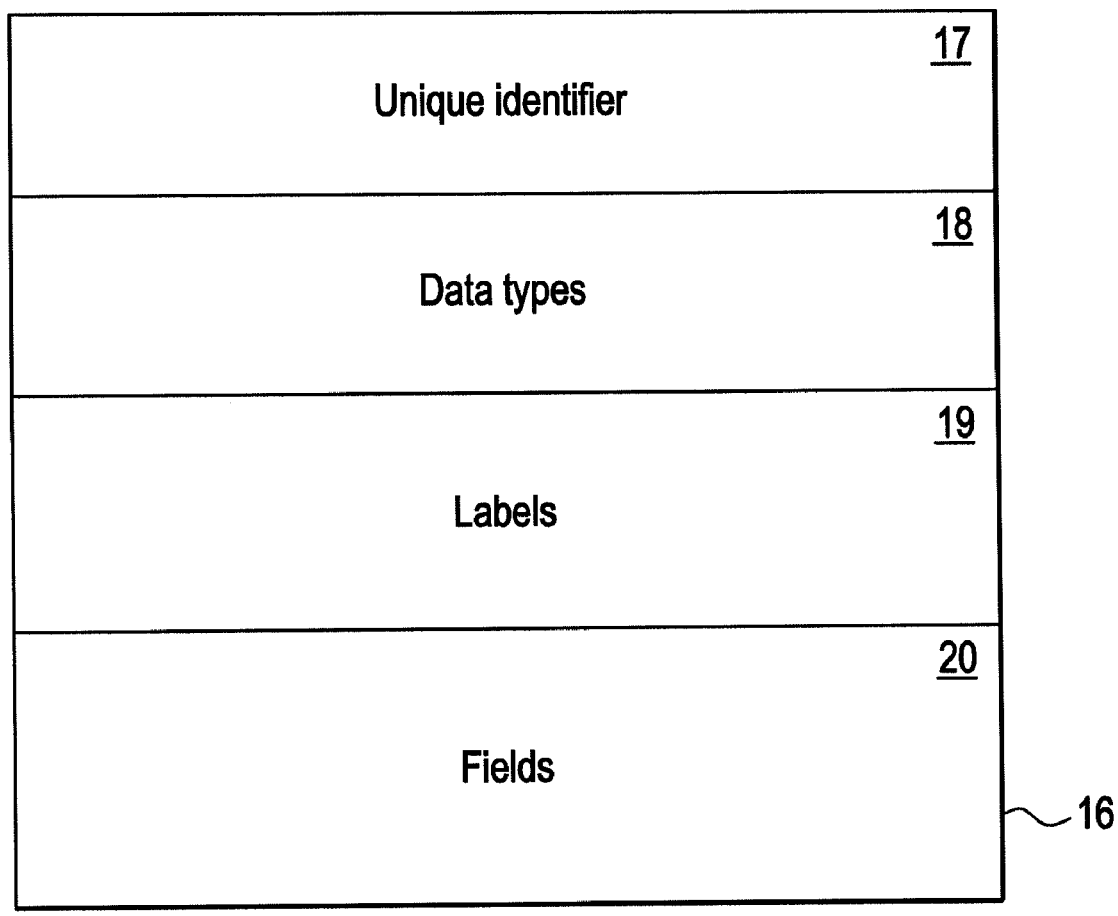
FIG. 6 illustrates an example of a configuration file implemented in XML.

In an embodiment of the present invention the configuration file dictates the structure of data within the data repository 2 and the layout of the user interface. FIG. 6 illustrates an example of the contents of a configuration file 16, which has a unique identifier 17 associated with it, and includes a set of fields 20 with default values and data types 18, and labels 19 for the fields 20. This simple format of the configuration file 16 allows the user to configure the configuration file 16 with minimal knowledge of HTML. Using the information contained in the configuration file 16, the configuration file 16 controls the fields 10 and formats available in the individual files 8 and the editing functions available for a database. Further, this plain format for a configuration file 16 is designed to allow for quick creation of the configuration file 16 and the extensible database. Therefore, due to the ease of constructing a configuration file 16, an administrator can easily configure the interface to specify one or more fields 20 for the database, with associated interface controls, associated default values, associated constraints on allowable values, and associated headers and formatting information for the page. Additional optional fields are also available for the configuration file 16 that control views of individual files and the database. FIG. 7 shows an example user interface provided to the user to configure the configuration file 16.

There is no limit to the number of configuration files 16 permitted within the extensible database system. This allows for implementation of different layouts for the user interface depending on the needs of the user and other related features.

Such simple configuration files 16 empower an administrator to design the edit form as desired simply by configuring the configuration file 16. Therefore, based on the configuration file 16 illustrated in FIG. 8, an administrator has specified that every input tag requires at least three attributes: 'id', 'type', and 'label'. The 'id' attribute defines the database fieldname, which is the name of the database. The 'label' attribute defines the label representing each field, and the 'type' attribute corresponds to the type of input data for that field. Further, an advanced user can add their own XSLT Stylesheet to the configuration file 16.

In an embodiment of the present invention, the configuration file 16 can be created in XML such that individual files for the database are also created in XML format.

In another embodiment of the present invention, the system can also configure a configuration file 16 or database to create its own configuration files 16. In case advanced functionality is required, such as a form implemented with JavaScript, the administrator can add a JavaScript code, as illustrated in FIG. 9, to the configuration file 16.

Access Controls

Access controls are further implemented on the server 1 to provide access limitations at the user and group levels. The access controls provide the permission levels of Reader, Writer, and Manager. Users with Reader permissions are permitted to see content of individual files and collections of individual files 12. Users with Writer permissions have the permissions of Readers with the addition of the ability to edit individual files 8. Users with Manager permissions have the permissions of both Readers and Writers with the additional ability to delete and create content contained in individual files 8. These various access limitations can be provided at the field level of an individual file 8 for Writer and Manager permissions.

Querying Data

The system also provides the ability to produce reports either through creating an integrated query or concatenating the contents of at least one database stored in the data repository 2 located on the server 1.

Figure 11:
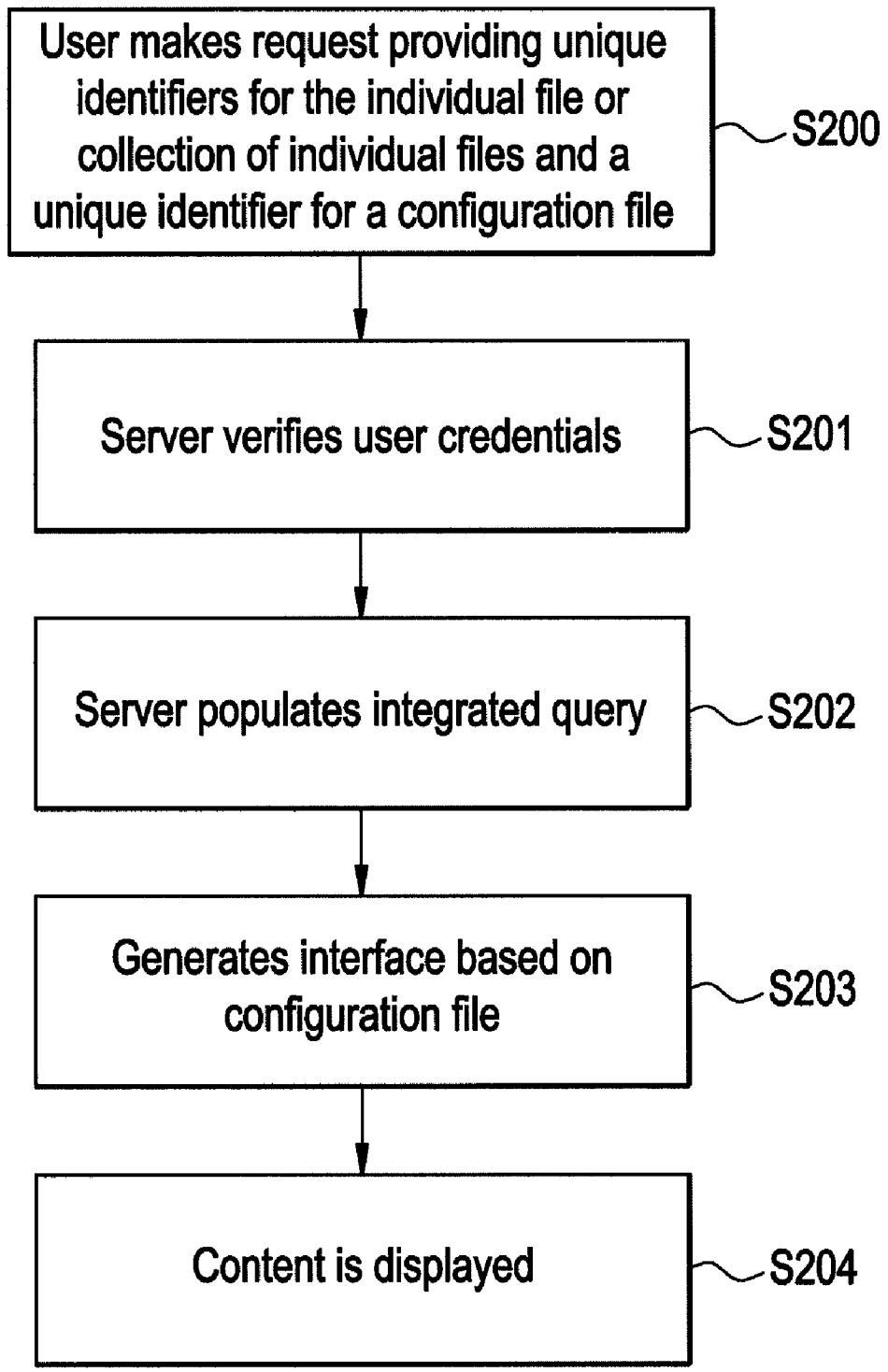
FIG. 11 shows the process for running a query using an integrated query provided by the server.

In an embodiment of the present invention a user chooses at least one field or field value pairs that are to be queried. As shown in FIG. 10, the user can choose to query several databases Report A, Report B, Report C, Report D, Report E, and Report F. The fields that are chosen in the interface, such as a data field, as shown in FIG. 10, are those that can be displayed once the query results are produced from the query of the system if the user selects them. Other controls, such as an Edit Mode field and page break field are also shown in FIG. 10. Referring to FIG. 11, the user's terminal will then make a request to the server 1 and provide the server 1 with the unique identifiers for a collection or collections of individual files 12 and the unique identifier for the configuration file 16 that corresponds to the query requested (S200). The server 1 will then verify the credentials of the user to determine whether that user can access the requested data to be included in the query based on access controls on the server 1 (S201). Additionally, the server 1 can make a determinations based on the modification date of each individual file 8 as to whether the most recent individual file 8 resides in a cache on the client 4 or the data repository 2 on a server. When the individual file 8 is accessed, the modification date for that individual file 8 will be updated. The individual files 8 are then collected and used to populate an integrated query, such that the contents of each individual file 8 are identifiable by their corresponding unique identifiers (S202). Once the integrated query is populated with individual files 8, the server 1 will generate an interface based on the configuration file 16 (S203) and display the contents of the integrated query (S204).

In an embodiment of the present invention, a stylesheet is applied to the integrated query to produce HTML to be displayed. In another embodiment of the present invention, the integrated query is provided to a browser, which uses JavaScript to produce the user interface.

Figure 12:
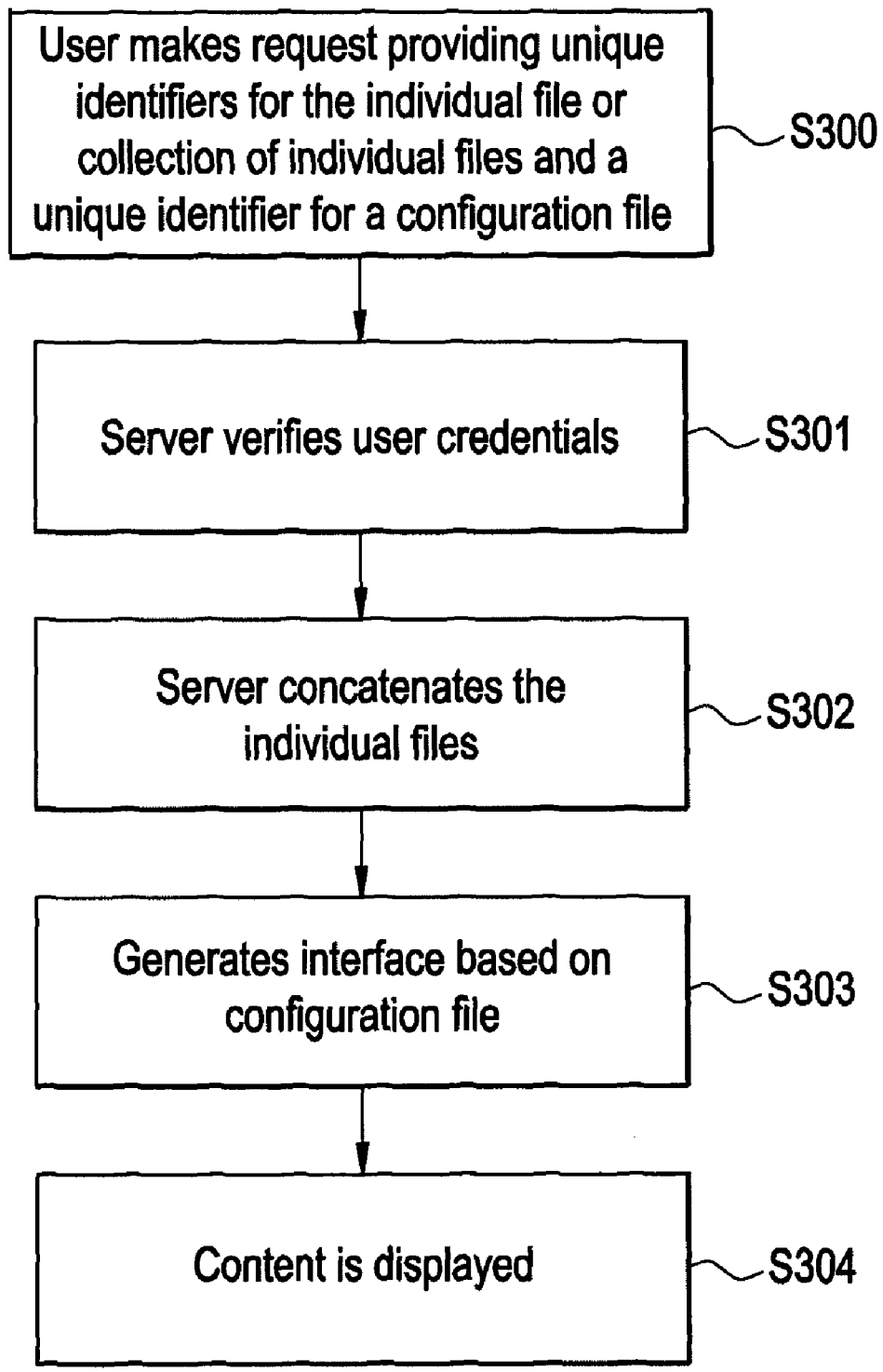
FIG. 12 shows the process for running a query using a concatenated file provided by the server.

In another embodiment of the present invention, concatenation is performed instead of a query, which is illustrated in FIG. 12. The user makes a request and provides unique identifiers for the individual file 8 or collection of individual files 12 and a unique identifier for a configuration file 16 (S300).

The server 1 will then verify the credentials of the user to determine whether that user can access the requested data to be included in the query based on access controls on the server 1 (S301). The server will then concatenate the individual files 8 (S302) and generate an interface based on the configuration file 16 (S303). Once the interface is generated, the content of the concatenated file is displayed (S304).

In one embodiment of the present invention, individual files 8 to be concatenated can be filtered prior to concatenation, based on the data structure in the configuration file 16, limiting the query result to those fields specified in the configuration file 16, which is referred to as pre-filtering. In another embodiment, this filtering is done after the individual files 8 have been concatenated, which is referred to as post-filtering.

In an embodiment of the present invention, the query results can be provided to the client 4 in the form of an XDB query result or an XML record file.

Displaying Query Results

Once the integrated query or concatenated file is provided to the client 4, the query results can be displayed to the user to allow the user to perform common business applications involving data from a data repository 2. Such applications include displaying the integrated query or concatenated file in a tabular format and providing forms to allow the user to edit content with commands that include ADD, EDIT, and DELETE, as illustrated in FIG. 13. The column headings of the tabular query results typically represent rows in database tables and are specified by the configuration file 16, and the rows of the table represent individual files 8 in the database. Column headings can be clicked to sort the column alphanumerically in ascending or descending order, and each row of the table represents the values for each field in a record of the database. Since each row corresponds to an individual file 8, the access controls for that individual file 8 can be applied to the displayed tabular format of the integrated query or concatenated such that row by row access controls are achieved.

In an embodiment of the present invention, the tabular format of the user interface is determined by a tree structure of data contained in the configuration file 16. The tree structure is specified such that column headers are designated as parent nodes and the associated data contained in the rows of the corresponding columns are designated as children nodes. Therefore, column labels would be specified as parent nodes in the configuration file 16 and the data associated with the labels would be specified as children nodes in the configuration file 16.

Rows of the table can be edited with a forms-based interface using standard HTML elements such as text fields, menus of discrete sets of options, calendars, browse buttons for uploading and associating files, anchors for associating and URLs. FIG. 13 shows an example of such an interface with tabular results containing EDIT links in each row for editing the record in the row.

The client's 4 tabular interface provides users with the ability to search across all the fields and if necessary narrow their search to any particular field. In addition, users have the ability to choose what fields they want to look at and by doing so can limit the client's 4 display to only the columns specified. The client 4 further provides a mechanism to dynamically add and remove columns using checkboxes generated from column headers.

Editing Functions

The system also allows for editing of individual files 8 and collections of individual files 12. The editing functions include, but are not limited to:

Adding new individual files
Adding new content to an existing individual file
Editing the content of an individual file
Deleting an individual file
Deleting content from an existing individual file
Creating and maintaining a change-log
Creating and maintaining a delete-log
Restoring individual files
Restoring content in an existing individual file Adding a New Individual File When a request is made to the server 1 to create a new individual file 8, the unique identifier for the collection of individual files 12 that the new individual file 8 is to be associated with and the unique identifier for the configuration file 16 associated with the configuration file 16 must be provided. Once this information is provided to the server 1, the server 1 will create a new individual file 8 and assign a unique identifier to the newly created individual file 8 based on the configuration file 16. The server 1 also will associate the new individual file 8 with the collection of individual files 12 located in the data repository 2. Further, the server 1 will provide the unique identifier of the newly created individual file 8 to client 4.

In an embodiment of the present invention, a new individual file 8 can be added to the database in XML format.

Adding New Content to an Existing Individual File

When requesting that new content be added to an existing individual file 8, the server 1 requires the unique identifier for the individual file 8 to which the new content is to be added, the data to be added, and the field of the individual file 8 in which the new content should be added. The server 1 will then retrieve the individual file 8 from the data repository 2 based on its unique identifier. Using the configuration file 16 that corresponds to the individual file 8, the server 1 will generate the structure of the new content within the individual file 8 and then insert the content into the specified field of the individual file 8. This feature does not require the entire database to be provided to the client 4 by the server 1 as is required in conventional systems.

In an embodiment of the present invention, the edits can be made on the integrated query or concatenated file, which is then used to update the individual files 8 on the server 1.

Editing the Content of Individual Files

Figure 14:
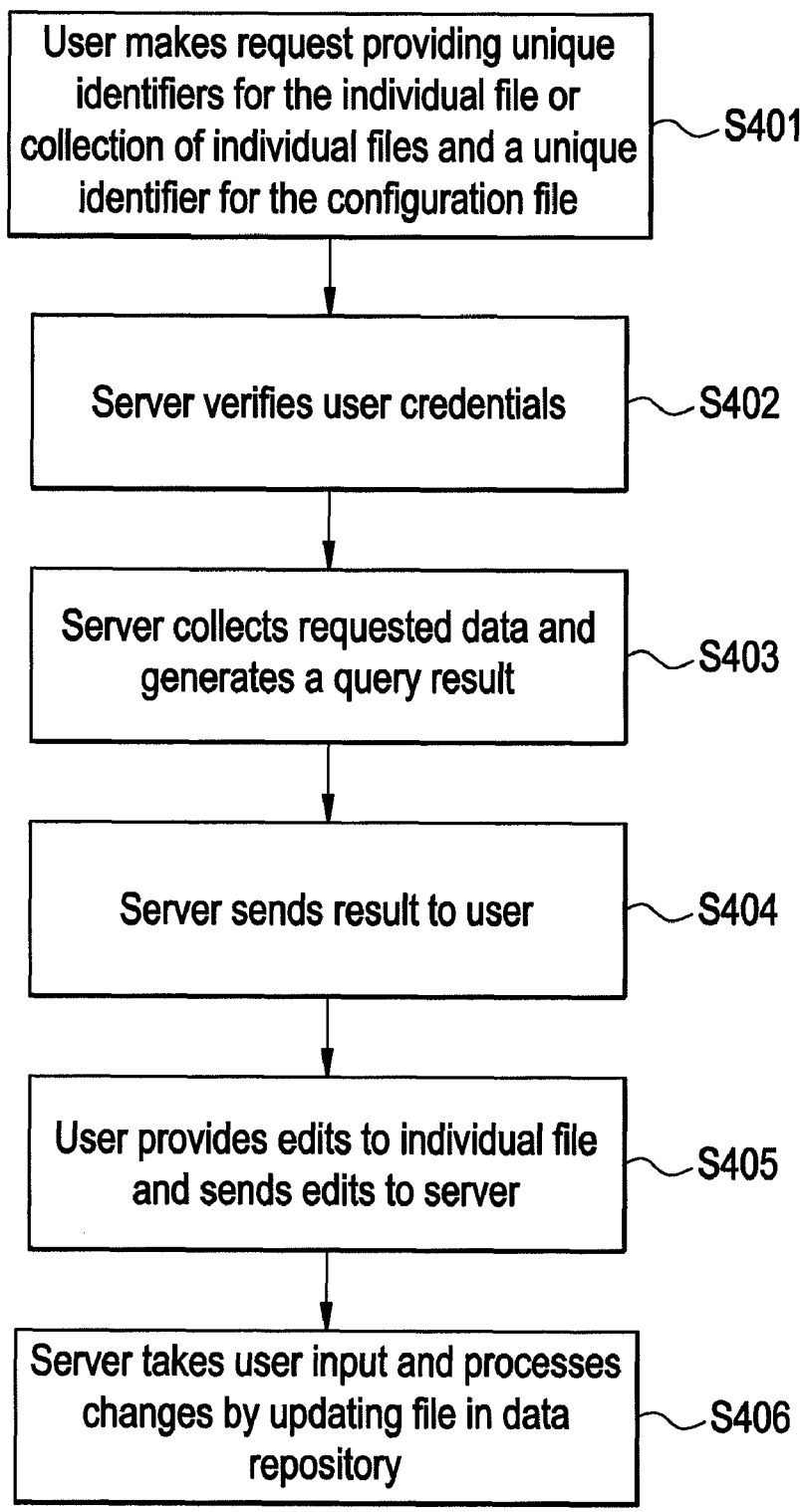
FIG. 14 illustrates the process for editing an individual file.

Referring to FIG. 14, when requesting modification of records, the server 1 requires the unique identifier for the individual file 8 or collection of individual files 12 and the unique identifier for the corresponding configuration file 16 (S401). The server 1 will then verify the credentials of the user to determine whether that user can access the requested data to be included in the query based on access controls on the server 1 (S402). The server 1 will collect the request data and generate a query result (S403). The query result is provided to the user by the server 1 (S404). The user will then provide edits to the individual file 8 and send the edits to the server 1 (S405). The server takes the user's input and processes the changes by updating the individual file 8 in the data repository 2a (S406).

In an embodiment of the present invention, the edits can be made on the integrated query or concatenated file, which is then used to update the individual files 8 on the server 1.

In an embodiment of the present invention the configuration files 16 governs the fields of an individual file 8 that can be edited and the type of values required for those forms. These restrictions can be implemented and defined using JavaScript function calls.

In yet another embodiment of the present invention, the editing function is performed through use of a user interface displayed on the terminal of the user allowing the user to enter data into data fields 30, 31, 32, 33, 34 that the user desires to edit, as illustrated in FIG. 15. The interface on FIG. 14 is reached when a user clicks an edit link that is provided on the displayed query results screen. The interface of FIG. 14 provides the user with buttons so that functions such as Save 35, Clear 36, and Cancel 37 are provided. Further, the interface can be implemented as an HTML form that allows the user to modify values of an individual file 8. Such an interface may be implemented using JavaScript.

In an embodiment of the present invention, the client 4 can be configured to execute a function, for example, in JavaScript, to validate the edited data before transmitting the updated individual file 8 back to the server 1.

In yet another embodiment of the present invention, only the fields that have been edited and their values are uploaded to the server 1 where there server 1 will then update the corresponding individual file 8 with the changed data. In this way, only the changed field/value pair need be transmitted from the client to the server, rather than transmitting the entire file back to the server.

Deleting an Individual File

When requesting deletion of an individual file 8, the server 1 requires the unique identifier of the individual file 8 to be deleted. The server 1 will then obtain the individual file 8 with the unique identifier provided to the server 1 and remove the individual file 8 from the data repository 2 on the server 1.

Deleting Content From an Individual File

Similar to the functionality of editing the content of an individual file 8, content of an individual file 8 can also be deleted. In a request to the server 1, the unique identifier of the individual file 8 containing the content to be deleted and the field that contains the content to be deleted must be provided. The server 1 will then obtain the individual file 8 based on the unique identifier provided and locate the field containing the contents to be deleted in that individual file 8. The server 1 then deletes the contents of the field and saves the individual file 8 back to the data repository 2.

In an embodiment of the present invention, the edits can be made on the integrated query or concatenated file, which is then used to update the individual files on the server 1.

The Change-Log

When each individual file 8 is created, a change-log for each individual file 8 is created, but only if the configuration file 16 associated with that individual file 8 specifies that a change-log is to be created for that individual file. The change-log will log changes made to individual files on a field-by-field basis. Therefore, the change-log will record additions to content of an existing individual file 8 and edits to the content of the individual file 8. Within the change-log, each individual file 8 that is recorded in the change-log is separated by its corresponding unique identifier.

In an embodiment of the present invention, the configuration file 16 may specify the maximum number of changes to log for each field.

In an embodiment of the present invention, each individual file 8 contains children "change" nodes which contain information about the user who created the individual file 8 or made the change to the individual file 8, the date and time that the changes were made to the individual file 8, and the actual content of the changes that were made to the individual file 8.

The Delete-Log

A delete-log for each individual file 8 is created when an individual file 8 is created, but only if the configuration file 16 associated with that individual file 8 specifies that a delete-log is to be created for that individual file 8. The delete-log stores deleted individual files 8 for later restoration, which is useful if accidental record deletion occurs or a deleted individual file 8 needs to be restored to the system.

In an embodiment of the present invention, the configuration file 16 may specify the maximum number of deleted individual files to retain. After the limit is reached, the oldest deleted individual file 8 will be removed from the delete-log when a newly deleted individual file 8 is to be added and the number of deleted files in the delete-log is over the maximum number allotted.

In an embodiment of the present invention, the delete-log may also record deleted content on a field-by-field basis for each individual file 8.

Restoring Individual Files

When requesting restoration of an individual file, the server 1 requires the unique identifier of the individual file 8 to be restored. The server 1 will read the delete-log associated with the deleted individual file 8, find the individual file 8 with the matching unique identifier, remove that individual file 8 from the delete log, and add it to the data repository 2 as if the file was never deleted. If the delete-log was not provided in the configuration file 16, an error message is displayed on the user terminal 6 notifying the user that there is no delete-log for individual file 8 that the user requested to be restored.

For all of the requests made to the server 1 for editing purposes, the server 1 will automatically authenticate based on the access controls residing on the server 1 to determine whether the user requesting the edits has access rights to the individual files and whether the user has permission to perform the requested edits.

Computer System

Figure 16:
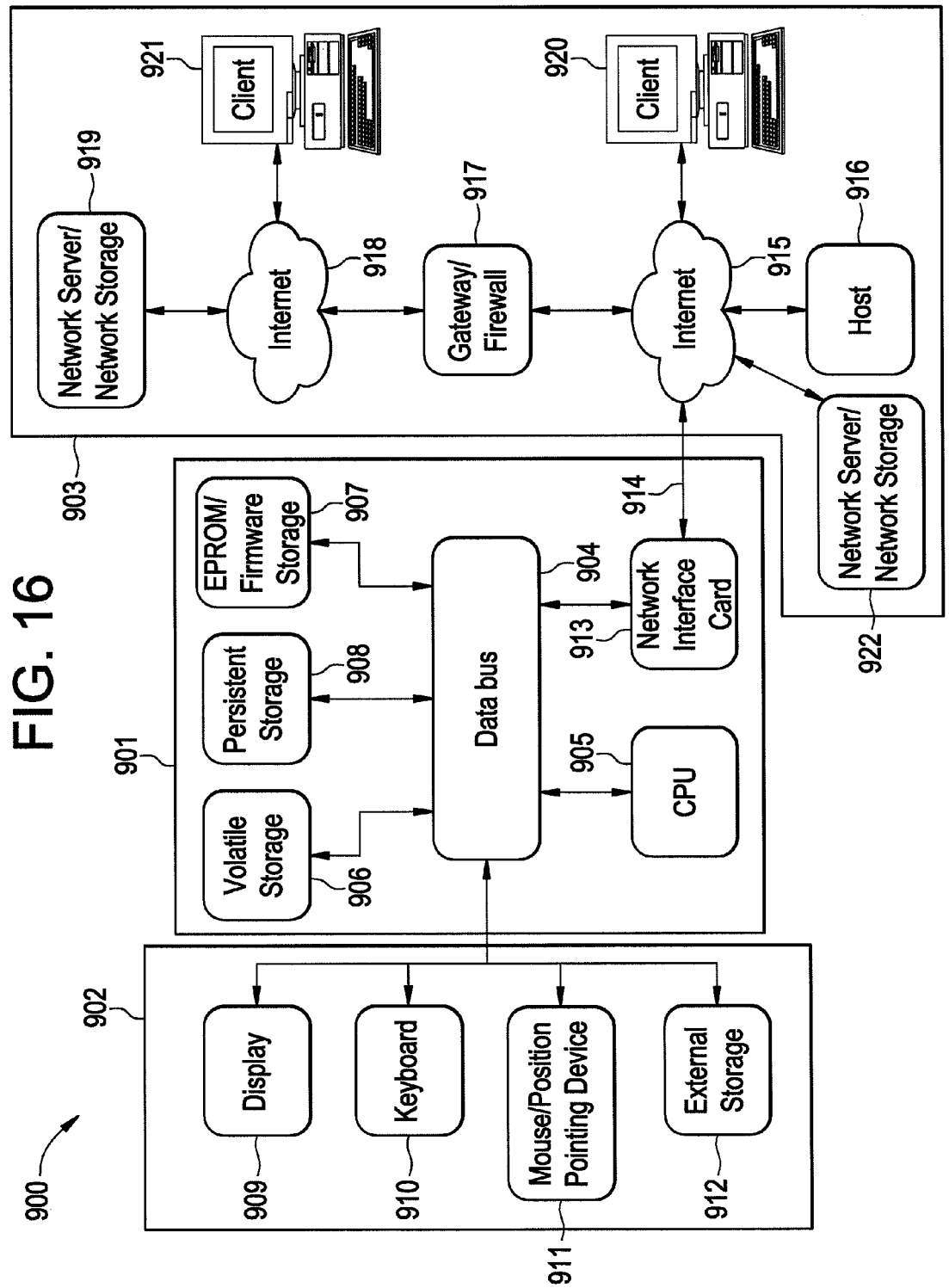
FIG. 16 shows an embodiment of a computer platform upon which an extensible business application framework system may be implemented.

As illustrated in FIG. 16, the invention is related to the use of computer system 900 for implementing the techniques described herein. In an embodiment, the inventive system may reside on a machine such as computer platform 901. According to one embodiment of the invention, the techniques described herein are performed by computer system 900 in response to processor 905 executing one or more sequences of one or more instructions contained in the volatile memory 906. Such instructions may be read into volatile memory 906 from another computer-readable medium, such as persistent storage device 908. Execution of the sequences of instructions contained in the volatile memory 906 causes processor 905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 905 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 908. Volatile media includes dynamic memory, such as volatile storage 906. Transmission media includes coaxial cables, copper wire and fiber optics, including the wires that comprise data bus 904.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 905 for execution. For example, the instructions may initially be carried on a magnetic disk from a remote computer. Alternatively, a remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on the data bus 904. The bus 904 carries the data to the volatile storage 906, from which processor 905 retrieves and executes the instructions. The instructions received by the volatile memory 906 may optionally be stored on persistent storage device 908 either before or after execution by processor 905. The instructions may also be downloaded into the computer platform 901 via Internet using a variety of network data communication protocols well known in the art.

The computer platform 901 also includes a communication interface, such as network interface card 913 coupled to the data bus 904. Communication interface 913 provides a two-way data communication coupling to a network link 914 that is connected to a local network 915. For example, communication interface 913 may be an integrated services digital network (ISDN) card or a modem to provide a data communication connection to a corresponding type of telephone line. As another example, communication interface 913 may be a local area network interface card (LAN NIC) to provide a data communication connection to a compatible LAN. Wireless links, such as well-known 802.11a, 802.11b, 802.11g and Bluetooth may also be used for network implementation. In any such implementation, communication interface 913 sends and receives electrical, electromagnetic or optical signals that carry digital data streams representing various types of information.

Network link 913 typically provides data communication through one or more networks to other network resources. For example, network link 914 may provide a connection through local network 915 to a host computer 916, or a network storage/server 917. Additionally or alternatively, the network link 913 may connect through gateway/firewall 917 to the wide-area or global network 918, such as an Internet. Thus, the computer platform 901 can access network resources located anywhere on the Internet 918, such as a remote network storage/server 919. On the other hand, the computer platform 901 may also be accessed by clients located anywhere on the local area network 915 and/or the Internet 918. The network clients 920 and 921 may themselves be implemented based on the computer platform similar to the platform 901.

Local network 915 and the Internet 918 both use electrical, electromagnetic or optical signals that carry digital data streams. The signals through the various networks and the signals on network link 914 and through communication interface 913, which carry the digital data to and from computer platform 901, are exemplary forms of carrier waves transporting the information.

Computer platform 901 can send messages and receive data, including program code, through the variety of network(s) including Internet 918 and LAN 915, network link 914 and communication interface 913. In the Internet example, when the system 901 acts as a network server, it might transmit a requested code or data for an application program running on client(s) 920 and/or 921 through Internet 918, gateway/firewall 917, local area network 915 and communication interface 913. Similarly, it may receive code from other network resources.

The received code may be executed by processor 905 as it is received, and/or stored in persistent or volatile storage devices 908 and 906, respectively, or other non-volatile storage for later execution. In this manner, computer system 901 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, Prolog, etc.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims and their equivalents, and all differences within the scope will be construed as being included in the present invention.

What is claimed is:

1. A method for editing data from a query result comprising data from a plurality of fields contained in a plurality of individual files each assigned with a unique identifier wherein a configuration file specifies the plurality of fields contained in the individual files and the plurality of individual files populate a collection of individual files having a unique collection identifier, comprising:

requesting a query result using the unique collection identifier for a collection of individual files and a unique identifier for a configuration file, the configuration file specifies a data structure for the query result;

generating the query result containing a plurality of fields specified by the configuration file by combining each of the plurality of individual files associated with a unique identifier for a collection of individual files such that the data of each individual file is differentiated by the unique identifier corresponding to the individual file from which the data originated in the query result;

displaying the data of the query result with a plurality of labels specified in the configuration file that describe the data of the query result, wherein a layout and format of the query result is determined based on display control variables specified in the configuration file, which specifies a plurality of fields to display in a predefined layout with the plurality of labels;

submitting an edit request of at least one file comprised of at least one field in the configuration file and at least one unique identifier corresponding to an individual file in the query result;

retrieving at least one individual file corresponding to the unique identifier of the edit request in the query result;

updating the fields contained in the individual file corresponding to the at least one unique identifier of the edit request of at least one file in the query result; and writing the updated individual file to the corresponding collection of individual files, wherein the configuration file comprises:

the unique identifier for the configuration file;

the plurality of fields, which correspond to fields of the plurality of individual files;

the plurality of display control variables for controlling the display of information of the individual file with the plurality of labels, and a plurality of data types for defining the type of data permitted for each field.

2. The method of claim 1, wherein the query result is generated by concatenating the contents of the plurality individual files associated with a unique identifier for a collection of individual files.

3. The method of claim 2, wherein the individual files are XML files.

4. The method of claim 2, wherein the each of the individual files has access controls.

5. The method of claim 4, wherein the query result is displayed as an editable html document in a web browser.

6. The method of claim 2, wherein each of the individual files is stored in a hierarchical collection of folders.

7. The method of claim 2, wherein the unique identifiers for the configuration file, the individual files, and the collection of individual files are associated with uniform resource locators (URLs).

8. The method of claim 1, wherein the data to be edited in the individual file is identified by an xml path (xpath) expression.

9. The method of claim 1, further comprising a means for editing documents in portable document format (pdf) editor; wherein the query result is an editable pdf document.

10. The method of claim 1, further comprising a means for writing the collection of individual files to the server once the individual files have been updated.

11. The method of claim 1, wherein the edit request is a request to add new content to at least one of the plurality of fields of an individual file.

12. The method of claim 1, wherein the edit request is a request to remove content from at least one of the plurality of fields of an individual file.

13. The method of claim 1, wherein the query request specifies one or more fields that exist in the configuration file and one or more corresponding values for the one or more fields.

14. The method of claim 13, wherein the one or more fields are specified using xml path (xpath) syntax.

* * * * *